Patented Jan. 19, 1932

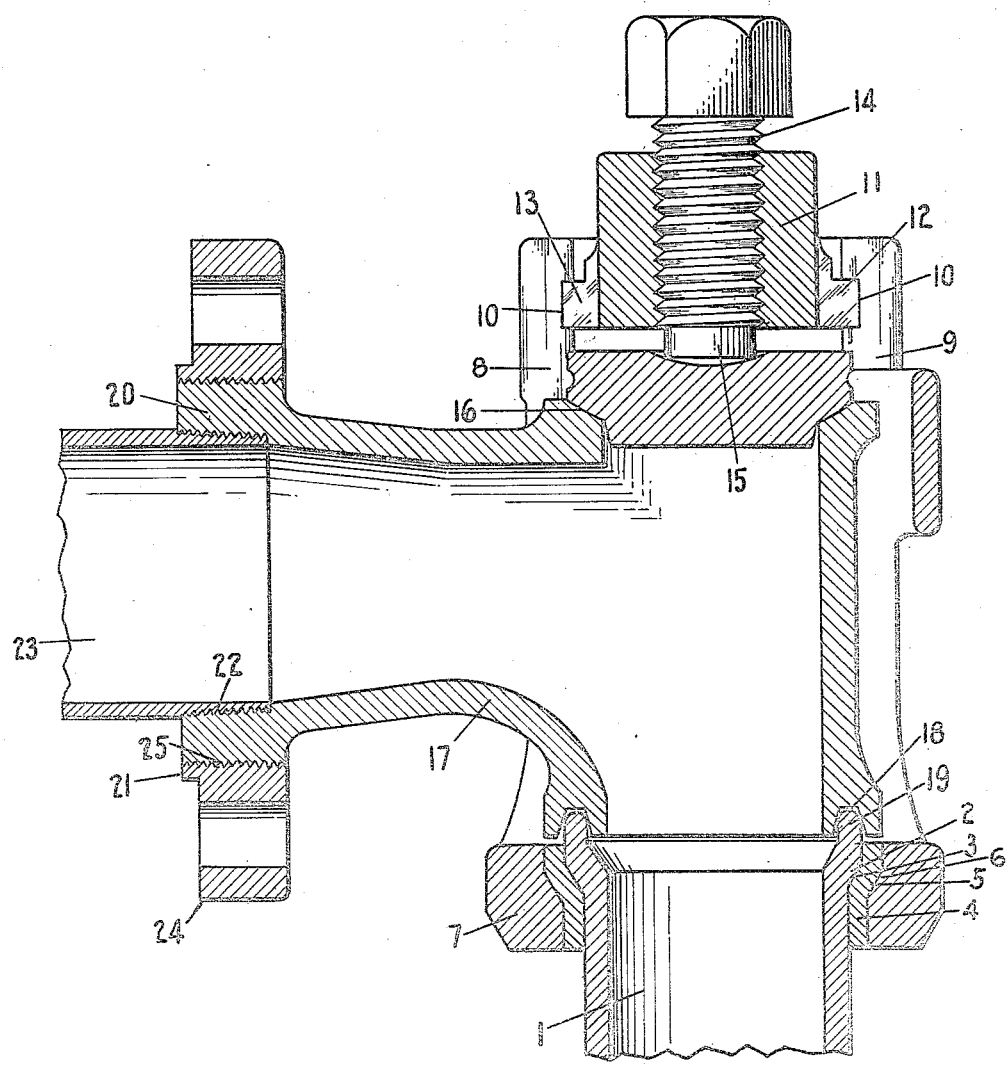

1,841,523

UNITED STATES PATENT OFFICE

MORTON B. CROWE AND JOHN E. GETZEN, OF BIRMINGHAM, ALABAMA, ASSIGNORS TO FRED C. FANTZ, OF WEBSTER GROVES, MISSOURI

BOX ELBOW

Application filed August 17, 1929. Serial No. 386,542.

Our invention relates to that class of elbows described in the application of Fred C. Fantz, Serial No. 352,780, filed April 5, 1929, for return bends, in which he has described, and illustrated in Figs. 5 to 7, an elbow used with the clamping device of his return bend.

Our invention has for its object, to provide a box elbow, which will afford easier means for cleaning the tubes of a still, which will also be capable of fitting either a flanged or a threaded tube, and which will afford a straight and unobstructed passage for a tube-cleaner through the elbow into the tube in a cracking still.

Our means for accomplishing the foregoing object may be more readily understood by reference to the accompanying drawing, which is hereto annexed and is a part of this specification, in which—

The figure is a vertical sectional view through an elbow formed in accordance with our improved construction. Similar reference numerals refer to similar parts throughout the entire description.

In the drawing only a fragmentary portion of a tube 1 is shown, as obviously our invention does not include the tubes in the cracking still. As illustrated, this tube 1 is formed with a flanged portion, forming a shoulder 2, which is engaged by a shoulder 3 on an annular sectional bushing 4. This bushing 4 is provided with an outer shoulder 5, which contacts a shoulder 6 formed on the inside of an annular portion 7 of the clamping device. The annular portion 7 is provided with two upwardly-extending segmental side walls 8 and 9. Slots 10 are formed adjacent the upper ends of these segmental side walls 8 and 9. A movable plate 11, having arms 12 and 13 which are fitted to the slots 10, is provided, and a set screw 14 is mounted therein, the end of which engages a plug 15 which is fitted to an opening 16 formed in the elbow 17. The opening 16 is of the same diameter as the inside diameter of the tube 1, so that by removing the movable plate 11 and the plug 15 it is possible to pass a tube-cleaner straight down into the tube 1 without any difficulty, and without any danger of injuring the joint between the elbow 17 and the tube 1. This joint is formed by an annular groove 18, formed in the face of the elbow 17, to which is fitted the end 19 of the tube 1.

The other end 20 of the elbow 17 is provided with internal threads 22, in which a pipe or tube 23 may be mounted in the usual manner. It may be found desirable in some cases to provide for a flanged connection on the elbow 17, instead of the internal threaded joint. When this is the case, we screw a flange 24 on to threads 25 cut or formed on the exterior of the elbow 17 adjacent its face 21. In this manner a single fitting can be used, which is available for either kind of a connection to the pipe or tube to which it is to be joined.

It will be apparent from the foregoing description that by tightening the set screw 14, the end of the tube 1 will be drawn tightly into the annular groove 18 formed in the face of the elbow 17, and a tight joint secured at that point. At the same time, the plug 15 will be pressed tightly against its seat in the opening 16, so that a tight joint is also secured at that point.

In an elbow of this kind there is little danger of the coke accumulated inside of the still affecting the plug 15, so as to interfere with its removal, as the turbulence set up in the elbow 17, due to the high velocity and pressure of the oil, will keep the corners of the elbow 17 adjacent the plug, free from coke. In this way we provide for easy access to the interior of the tubes, notwithstanding the high temperature maintained in the cracking still.

Having described our invention, what we regard as new, and desire to secure by Letters Patent of the United States, is:

1. The combination, with an annular member which encircles the end of a tube, a sectional bushing intermediate said annular member and said tube, side walls on said annular member, detachable means mounted therein, and a set screw mounted in said detachable means, of an elbow, having an opening in its wall in alignment with one of its outlets, and a plug mounted in said opening, engaged by the end of said set screw, whereby the tightening of said set screw will draw and hold the face of said elbow and the end of said tube tightly together.

2. The combination with an annular member which encircles the end of a tube, a sectional bushing intermediate said annular member and said tube, side walls on said annular member, there being slots in said side walls, a detachable plate mounted therein, and a set screw mounted in said detachable plate, of an elbow, having an opening in its wall in alignment with one of its outlets, there being an annular groove in the face of said outlet, which fits the end of said tube, and a plug mounted in said opening, engaged by the end of said set screw, whereby the tightening of said set screw will draw and hold the end of said tube tightly into engagement with said annular groove.

3. The combination, with an annular member which encircles the end of a tube, there being a shoulder on said tube, a sectional bushing intermediate said annular member and said tube, which engages said shoulder, side walls on said annular member, there being slots in said side walls, a detachable plate mounted therein, and a set screw mounted in said detachable plate, of an elbow, having an opening in its wall in alignment with one of its outlets, there being an annular groove in the face of said outlet, which fits the end of said tube, and a plug mounted in said opening, which is engaged by the end of said set screw, whereby the tightening of said set screw will draw and hold the end of said tube tightly into said annular groove.

MORTON B. CROWE.
JOHN E. GETZEN.